US012751417B2

(12) United States Patent
Liu et al.

(10) Patent No.: US 12,751,417 B2
(45) Date of Patent: Oct. 6, 2026

(54) AUTOMATIC CAT LITTER BOX

(71) Applicant: UBTECH ROBOTICS CORP LTD, Shenzhen (CN)

(72) Inventors: Yudong Liu, Shenzhen (CN); Yangming Qian, Shenzhen (CN); Jin Li, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 19/422,432

(22) Filed: Dec. 17, 2025

(65) Prior Publication Data

US 2026/0165286 A1 Jun. 18, 2026

Related U.S. Application Data

(63) Continuation of application No. PCT/CN2024/078513, filed on Feb. 26, 2024.

(30) Foreign Application Priority Data

Jul. 21, 2023 (CN) ......................... 202310910146.9

(51) Int. Cl.
*A01K 1/01* (2006.01)

(52) U.S. Cl.
CPC ............ *A01K 1/0112* (2025.08); *A01K 1/011* (2013.01)

(58) Field of Classification Search
CPC .... A01K 1/0107; A01K 1/011; A01K 1/0112; A01K 1/0114
See application file for complete search history.

(56) References Cited

U.S. PATENT DOCUMENTS 6,286,457 B1 * 9/2001 Sugahara ............. A01K 1/0114 119/161
10,231,431 B1 * 3/2019 Turner ................... A01K 1/011
(Continued)

FOREIGN PATENT DOCUMENTS

CN 203729452 U 7/2014
CN 211116853 U 7/2020
(Continued)

OTHER PUBLICATIONS

ISR for PCT/CN2024/078513.
Written opinions of ISA for PCT/CN2024/078513.

*Primary Examiner* — Monica L Perry

(57) ABSTRACT

An automatic cat litter box includes a rotating drum mechanism. The rotating drum mechanism includes a rotating drum, a door assembly movably connected to the rotating drum, and a waste collection compartment. The door assembly includes a pressing portion. The waste collection compartment is disposed in the rotating drum. The waste collection compartment includes an opening portion. The opening portion is annular. When the door assembly is closed, the pressing portion is engaged with at least a portion of the opening portion. At this time, the pressing portion and the opening portion limit and support each other. The pressing portion limits a deformation of the opening portion, and the opening portion also limits a deformation of the pressing portion, thereby preventing cat litter leakage caused by deformations of the door assembly and the waste collection compartment.

6 Claims, 6 Drawing Sheets

(56) References Cited

U.S. PATENT DOCUMENTS

| | | | | |
|---|---|---|---|---|
| 2006/0172411 | A1* | 8/2006 | Gamlin | A01K 67/33<br>435/290.3 |
| 2007/0227457 | A1* | 10/2007 | Waters | A01K 1/0114<br>119/166 |
| 2008/0017123 | A1* | 1/2008 | Chin | A01K 1/0114<br>119/166 |
| 2023/0247967 | A1* | 8/2023 | Ma | A01K 1/0114<br>119/166 |
| 2026/0174058 | A1* | 6/2026 | Shi | A01K 1/01 |

FOREIGN PATENT DOCUMENTS

| | | | | | |
|---|---|---|---|---|---|
| CN | 211510180 | U | | 9/2020 | |
| CN | 114027203 | A | | 2/2022 | |
| CN | 218245031 | U | | 1/2023 | |
| DE | 202025107893 | U1 | * | 1/2026 | A01K 1/0114 |
| NL | 1002342 | C1 | * | 8/1997 | A01K 1/0114 |
| WO | WO-2025179730 | A1 | * | 9/2025 | A01K 1/0114 |

* cited by examiner

AUTOMATIC CAT LITTER BOX

CROSS REFERENCE TO RELATED APPLICATIONS

The present application is a continuation-application of International Application PCT/CN2024/078513, with an international filing date of Feb. 26, 2024, which claims foreign priority to Chinese Patent Application No. 202310910146.9, filed on Jul. 21, 2023, in the China National Intellectual Property Administration, the contents of all of which are hereby incorporated by reference in its entirety.

TECHNICAL FIELD

The present disclosure relates to a technical field of pet supplies, and in particular to a rotating drum mechanism and an automatic cat litter box.

BACKGROUND

Currently, there are many different styles of automatic cat litter boxes on the market. Some automatic cat litter boxes have a waste collection compartment disposed inside a rotating drum thereof, with an openable and closable door on the rotating drum. A user able to open the door to remove the waste collection compartment.

However, during a rotation of the rotating drum, some cat litter may get thrown out of the door, causing the cat litter to scatter on a floor area around a corresponding automatic cat litter box, which affects usability. As a result, the user needs to frequently clean the floor area, which increases the workload of the user.

SUMMARY

In order to solve a problem of cat litter being thrown out by conventional automatic cat litter boxes, one of purposes of the present disclosure is to provide a an automatic cat litter box.

The automatic cat litter box comprises a rotating drum mechanism. The rotating drum mechanism comprises a rotating drum, a door assembly movably connected to the rotating drum, and a waste collection compartment.

The waste collection compartment is detachably disposed in the rotating drum mechanism. The door assembly comprises a pressing portion. The waste collection compartment is disposed in the rotating drum. The waste collection compartment comprises an opening portion. The opening portion is annular. When the door assembly is closed, the pressing portion is engaged with at least a portion of the opening portion.

In one optional embodiment, the pressing portion defines a concave surface, the opening portion defines a convex surface, and the concave surface of the pressing portion is attached to the convex surface of the opening portion when the door assembly is closed.

In one optional embodiment, a cross section of the concave surface of the pressing portion and a cross section of the convex surface of the opening portion are arc-shaped.

In one optional embodiment, a cross section of the concave surface of the pressing portion and a cross section of the convex surface of the opening portion are wedge-shaped.

In one optional embodiment, the door assembly comprises a door and a door support. The door support is fixedly connected to the door. The door support is disposed on one side of the door facing an interior of the rotating drum. The pressing portion is disposed on the door support.

In one optional embodiment, first reinforcing ribs are disposed on an inner wall of the door support.

In one optional embodiment, second reinforcing ribs are disposed on an outer sidewall of the waste collection compartment.

In one optional embodiment, the opening portion comprises a first side edge, a second side edge, and two third side edges. The first side edge is located on a first side of the opening portion away from the door assembly. The second side edge is located on a second side of the opening portion close to the door assembly. Each of the third side edges is connected to the first side edge and the second side edge. The pressing portion is engaged with the second side edge of the opening portion when the door assembly is closed.

In one optional embodiment, the pressing portion is further engaged with the two third side edges of the opening portion when the door assembly is closed.

In the rotating drum mechanism of the automatic cat litter box, the door assembly comprises the pressing portion, and the waste collection compartment comprises the opening portion. When the door assembly is closed, the pressing portion is engaged with at least a portion of the opening portion. At this time, the pressing portion and the opening portion mutually limit and support each other, the pressing portion limits a deformation of the opening portion, and the opening portion also limits a deformation of the pressing portion, thereby preventing cat litter leakage caused by deformations of the door assembly and the waste collection compartment. Furthermore, when either the pressing portion or the opening portion deforms, the other deforms accordingly, so that the pressing portion and the opening portion still present good sealing performance, which further prevents the cat litter from leakage.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

Figure 1:
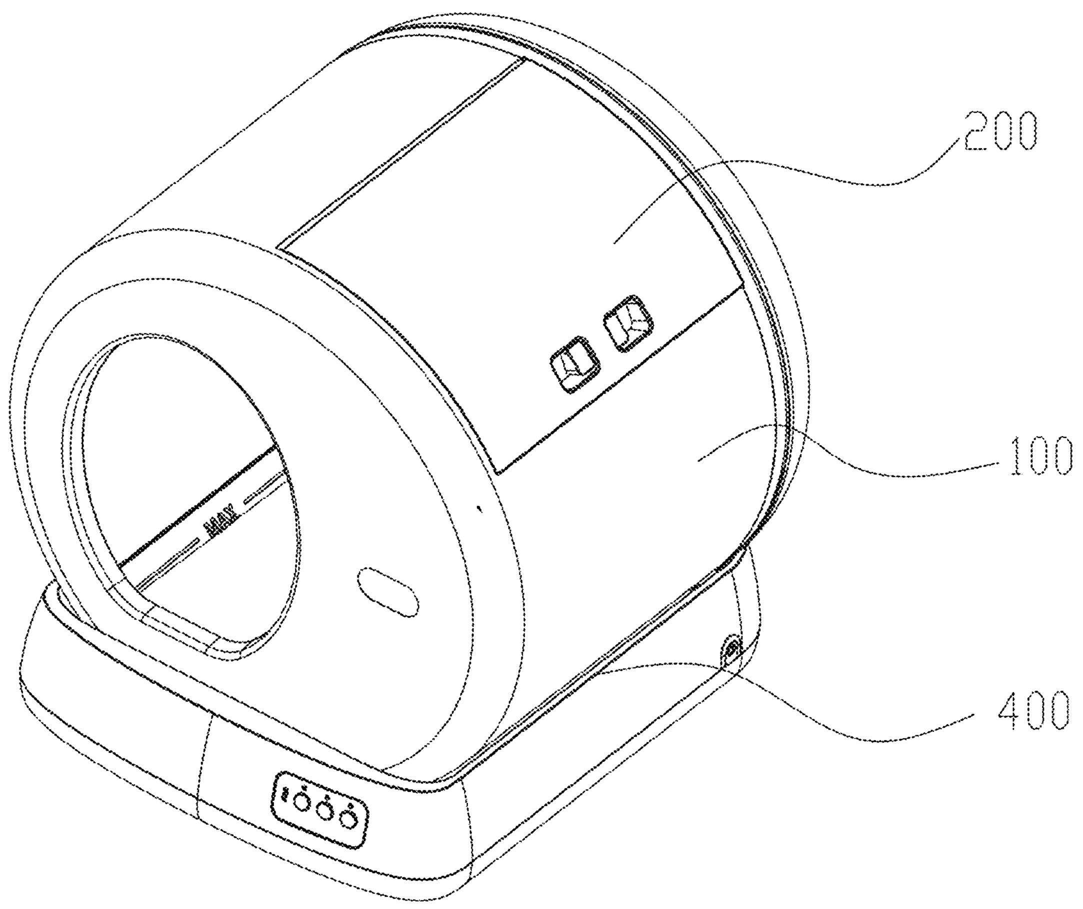
FIG. 1 is a schematic diagram of an automatic cat litter box according to one embodiment of the present disclosure.

In the drawings: 100—rotating drum; 110—limiting portion; 120—gear ring; 200—door assembly; 210—door;

220—door support; 221—pressing portion; 222—concave surface; 223—first reinforcing rib; 300—waste collection compartment; 310—opening portion; 311—first side edge; 312—second side edge; 313—third side edge; 314—convex surface; 320—second reinforcing rib; 400—base.

DETAILED DESCRIPTION

Embodiments of the present disclosure are described in detail below. Examples of the embodiments are shown in the accompanying drawings, in which the same or similar reference numerals indicate the same or similar elements or elements with the same or similar functions. The embodiments described below with reference to the drawings are exemplary, and are intended to explain the present disclosure, but should not be regarded as a limitation to the present disclosure.

It should be noted that when an element is referred to as being "fixed to" another element, it may be directly fixed to another element or indirectly fixed to another element through intervening elements. When the element is considered to be "connected" to another element, it may be directly connected to another element or intervening elements may be present at the same time. When the element is considered to be "directly connected" to another element, there is no intervening element. The terms "vertical", "horizontal", "left", "right", and the like, as used herein, are for illustrative purposes only.

It should be noted in the description of the present disclosure that, unless otherwise regulated and defined, terms such as "installation," "bonded," and "connection" shall be understood in a broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

In addition, terms such as "first" and "second" are only used for the purpose of description, rather than being understood to indicate or imply relative importance or hint the number of indicated technical features. Thus, the feature limited by "first" and "second" can explicitly or implicitly comprise one or more features. In the description of the present disclosure, the meaning of "a plurality of" is two or more unless otherwise specified.

Unless otherwise defined, all technical and scientific terms used herein have the same meaning as commonly understood by those skilled in the art of the present disclosure. The terms used in the description of the present disclosure herein are only for the purpose of describing specific embodiments, and are not intended to limit the present disclosure. The term "and/or" used in the present disclosure comprises any and all combinations of one or more of the associated listed items.

As shown in FIGS. 2-6, the present disclosure provides a rotating drum mechanism applied to an automatic cat litter box. The rotating drum mechanism comprises a rotating drum 100, a door assembly 200, and a waste collection compartment 300. Both the door assembly 200 and the waste collection compartment 300 are mounted on the rotating drum 100.

Specifically, the rotating drum 100 is cylindrical and rotatable around an axis thereof during use.

The door assembly 200 is disposed on one sidewall of the rotating drum 100 and is movably connected to the rotating drum 100. The door assembly 200 comprises a pressing portion 221.

The waste collection compartment 300 is embedded in the rotating drum 100 and is configured to collect cat feces. The waste collection compartment 300 comprises an opening portion 310. The opening portion 310 is annular. When the rotating drum 100 rotates, the cat feces enter the waste collection compartment 300 through the opening portion 310.

During use, a user is able to periodically open the door assembly 200 to take out the waste collection compartment 300, thereby collecting and emptying the cat feces.

Figure 5:
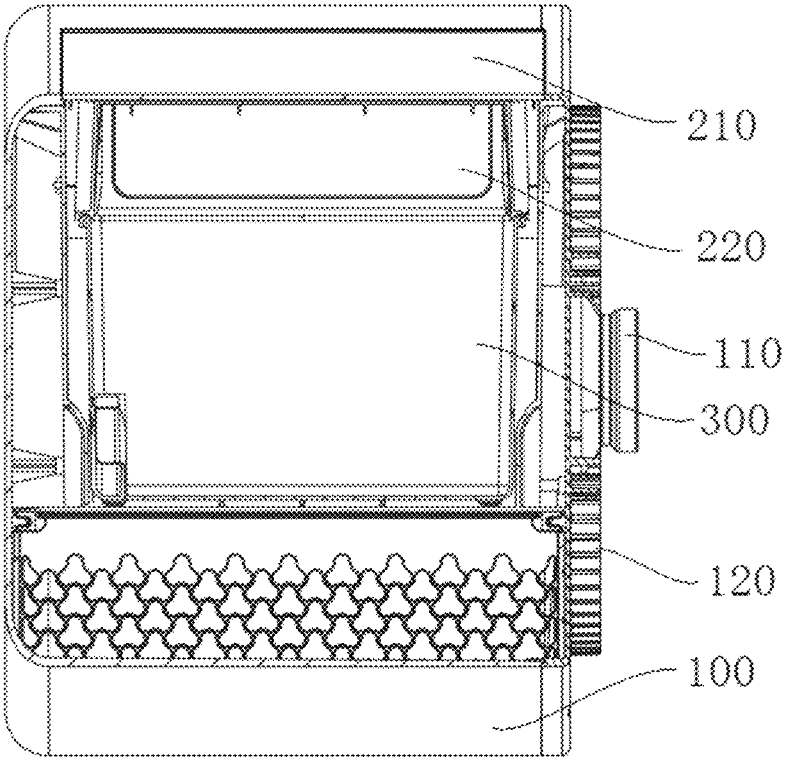
FIG. 5 is a schematic diagram of an interior of the rotating drum mechanism according to one embodiment of the present disclosure, where the door assembly is in a closed state.

As shown in FIG. 5, when the door assembly 200 is closed, the pressing portion 221 is engaged with at least a portion of the opening portion 310. At this time, the pressing portion 221 and the opening portion 310 mutually limit and support each other; the pressing portion 221 limits a deformation of the opening portion 310, and the opening portion 310 also limits a deformation of the pressing portion 221, thereby preventing cat litter leakage caused by deformations of the door assembly 200 and the waste collection compartment 300. Furthermore, when either the pressing portion 221 or the opening portion 310 deforms, the other deforms accordingly, so that the pressing portion 221 and the opening portion 310 still present good sealing performance, which further prevents the cat litter from leakage.

In contrast, contacts surfaces of a door assembly and a waste collection compartment of a conventional automatic cat litter box are flat. When the door assembly and/or the waste collection compartment of the conventional automatic cat litter box deforms, a gap is formed therebetween. During a rotation of the rotating drum mechanism of the conventional automatic cat litter box, cat litter may leak out from the gap, causing inconvenience to the user.

Specifically, the opening portion 310 is square. The opening portion 310 comprises a first side edge 311, a second side edge 312, and two third side edges 313. The first side edge 311 is located on a first side of the opening portion 310 away from the door assembly 200. The second side edge 312 is opposite to the first side edge 311 and is located on a second side of the opening portion 310 close to the door assembly 200. A first one of the third side edges 313 is connected to a first end of the first side edge 311 and a first end of the second side edge 312. A second one of the third side edges 313 is connected to a second end of the first side edge 311 and a second end of the second side edge 312.

In the embodiment, the pressing portion 221 is engaged with the second side edge 312 and the two third side edges 313 of the opening portion 310 when the door assembly 200 is closed.

In another embodiment, the pressing portion 221 is only engaged with the second side edge 312 of the opening portion 310 when the door assembly 200 is closed.

Figure 6:
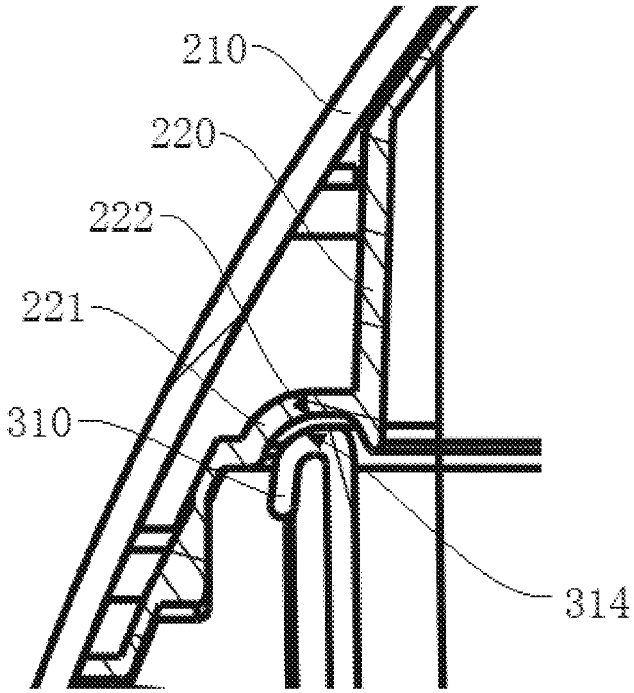
FIG. 6 is a schematic diagram showing a connection between a pressing portion and an opening portion of the rotating drum mechanism according to one embodiment of the present disclosure.

As shown in FIG. 6, in one optional embodiment, the pressing portion 221 defines a concave surface 222, and the opening portion 310 defines a convex surface 314. When the door assembly 200 is closed. The second side edge 312 and the two third side edges 313 of the opening portion 310 are embedded in the pressing portion 221, and the concave surface 222 of the pressing portion 221 is tightly attached to the convex surface 314 of the opening portion 310.

In one alternative embodiment, the opening portion 310 defines the concave surface 222, and the pressing portion 221 defines the convex surface 314. When the door assembly 200 is closed, the pressing portion 221 is embedded into the second side edge 312 and the two third side edges 313 of the opening portion 310.

In one optional embodiment, a cross section of the concave surface 222 of the pressing portion 221 and a cross section of the convex surface 314 of the opening portion 310 are arc-shaped. That is, the concave surface 222 of the pressing portion 221 and the convex surface 314 of the opening portion 310 are arc-shaped. Therefore, when the door assembly 200 is closed, the pressing portion 221 and the opening portion 310 fit together to maintain a tight seal. Further, the concave surface 222 of the pressing portion 221 and the convex surface 314 of the opening portion 310 create a larger contact area therebetween than two flat surfaces of the pressing portion and the opening portion of the conventional automatic cat litter box, which further prevents the cat litter from leakage.

In one alternative embodiment, the cross section of the concave surface 222 of the pressing portion 221 and the cross section of the convex surface 314 of the opening portion 310 are wedge-shaped. That is, the concave surface 222 of the concave surface 222 and the convex surface 314 of the opening portion 310 have inclined sidewalls facing each other.

Figure 2:
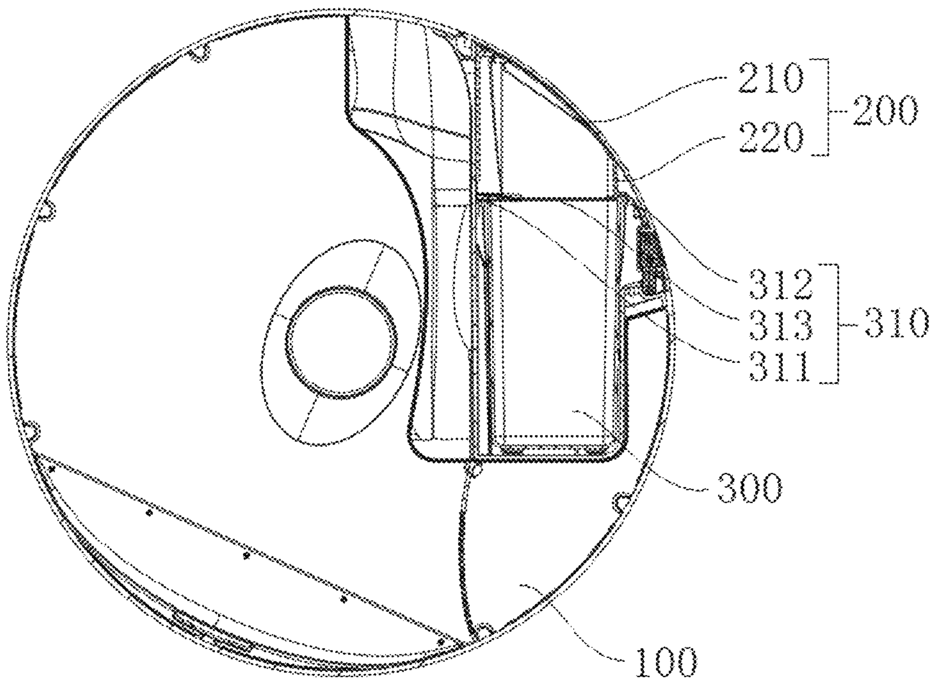
FIG. 2 is a schematic diagram of a rotating drum mechanism according to one embodiment of the present disclosure.

Furthermore, as shown in FIG. 2, the door assembly 200 comprises a door 210 and a door support 220.

The door 210 is hinged to a first side of the rotating drum 100 along a circumferential direction of the rotating drum 100, and the door 210 is detachably connected to a second side of the rotating drum 100 along the circumferential direction of the rotating drum 100 through a locking structure. The user is able to open the door 210 after unlocking the door 210, and the user is also able to lock the door 210 after closing the door 210, so as to prevent the door 210 from opening during the rotation of the rotating drum 100.

The door support 220 is fixedly connected to the door 210. The door support 220 is disposed on one side of the door 210 facing an interior of the rotating drum 100. The pressing portion 221 is disposed on the door support 220.

In a manufacturing process, the door 210 and the door support 220 are designed and processed separately, and then assembled together. In this way, a structural strength of the door assembly 200 significantly increases, effectively reducing deformation and thus preventing cat litter leakage.

In contrast, a door of the conventional automatic cat litter box is a single part, which is prone to noticeable deformation during use.

Figure 3:
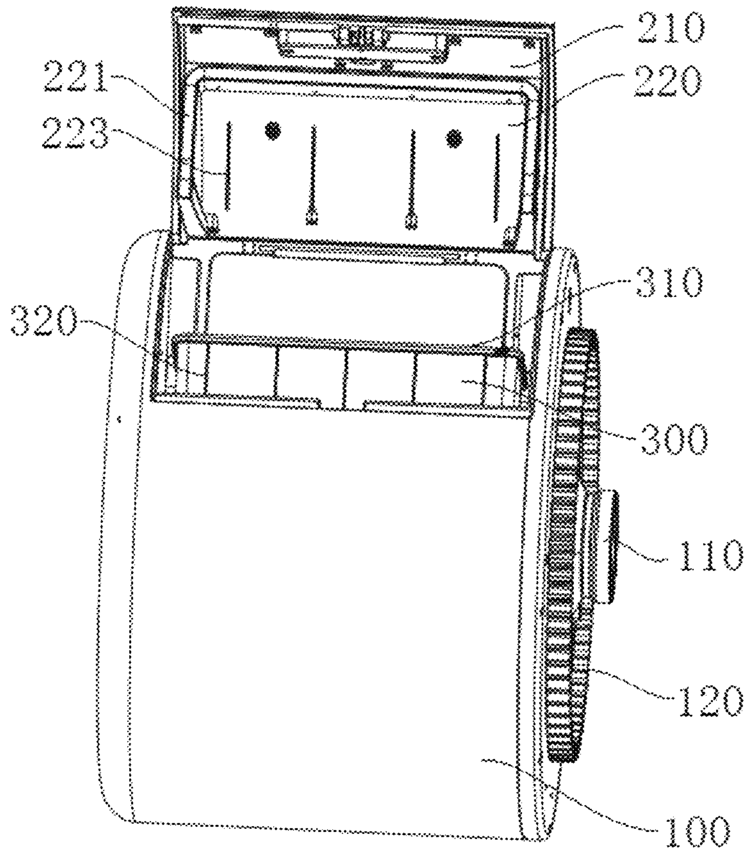
FIG. 3 is another schematic diagram of the rotating drum mechanism according to one embodiment of the present disclosure, where a door assembly is in an open state.

Furthermore, as shown in FIG. 3, first reinforcing ribs 223 are disposed on an inner wall of the door support 220. The first reinforcing ribs 223 are disposed along the circumferential direction of the rotating drum 100, and the first reinforcing ribs 223 are arranged along an axis direction of the rotating drum 100.

When in use, the first reinforcing ribs 223 further improve the structural strength of the door support 220 and make the door support 220 less prone to deformation, which is conducive to sealing and fitting of the pressing portion 221 on the door support 220 and the opening portion 310 on the waste collection compartment 300.

Similarly, second reinforcing ribs 320 are disposed on an outer sidewall of the waste collection compartment 300. The second reinforcing ribs 320 are disposed along the circumferential direction of the rotating drum 100, and the second reinforcing ribs 320 are arranged along the axis direction of the rotating drum 100.

When in use, the second reinforcing ribs 320 further improve the structural strength of the waste collection compartment 300 and make the waste collection compartment 300 less prone to deformation, which is conducive to sealing and fitting of the pressing portion 221 on the door support 220 and the opening portion 310 on the waste collection compartment 300.

In the rotating drum mechanism, the door assembly 200 comprises the pressing portion 221, and the waste collection compartment 300 comprises the opening portion 310. When the door assembly 200 is closed, the pressing portion 221 is engaged with at least a portion of the opening portion 310. At this time, the pressing portion 221 and the opening portion 310 mutually limit and support each other; the pressing portion 221 limits the deformation of the opening portion 310, and the opening portion 310 also limits the deformation of the pressing portion 221, thereby preventing cat litter leakage caused by the deformations of the door assembly 200 and the waste collection compartment 300. Furthermore, when either the pressing portion 221 or the opening portion 310 deforms, the other deforms accordingly, so that the pressing portion 221 and the opening portion 310 still present good sealing performance, which further prevents the cat litter from leakage.

Based on this, the door assembly 200 is designed separately as the door 210 and the door support 220. The first reinforcing ribs 223 are disposed on the door support 220, and the second reinforcing ribs 320 are disposed on the waste collection compartment 300. In this way, the structural strengths of the door assembly 200 and the waste collection compartment 300 are improved, the deformations of the pressing portion and the opening portion are reduced, and the possibility of cat litter leakage is reduced.

In summary, the rotating drum mechanism solves the problem of cat litter leaking out of the door assembly 200 when the rotating drum 100 rotates, so that the user does not need to spend time and effort on cleaning up the cat litter spilled onto the floor.

The present disclosure further provides an automatic cat litter box. As shown in FIG. 1, the automatic cat litter box comprises a base 400, a drive motor, and the rotating drum mechanism described above. The rotating drum 100 in the rotating drum mechanism is rotatably mounted on the base 400 and is rotatable around the axis thereof. An output shaft of the drive motor is connected to the rotating drum 100, so as to drive the rotating drum 100 to rotate.

Specifically, the base 400 comprises a mounting groove configured to hold the rotating drum 100, and rollers are rotatably mounted on a bottom portion of the mounting groove to provide rotational support for the rotating drum 100 and reduce frictional resistance experienced by the rotating drum 100 during rotation.

Figure 4:
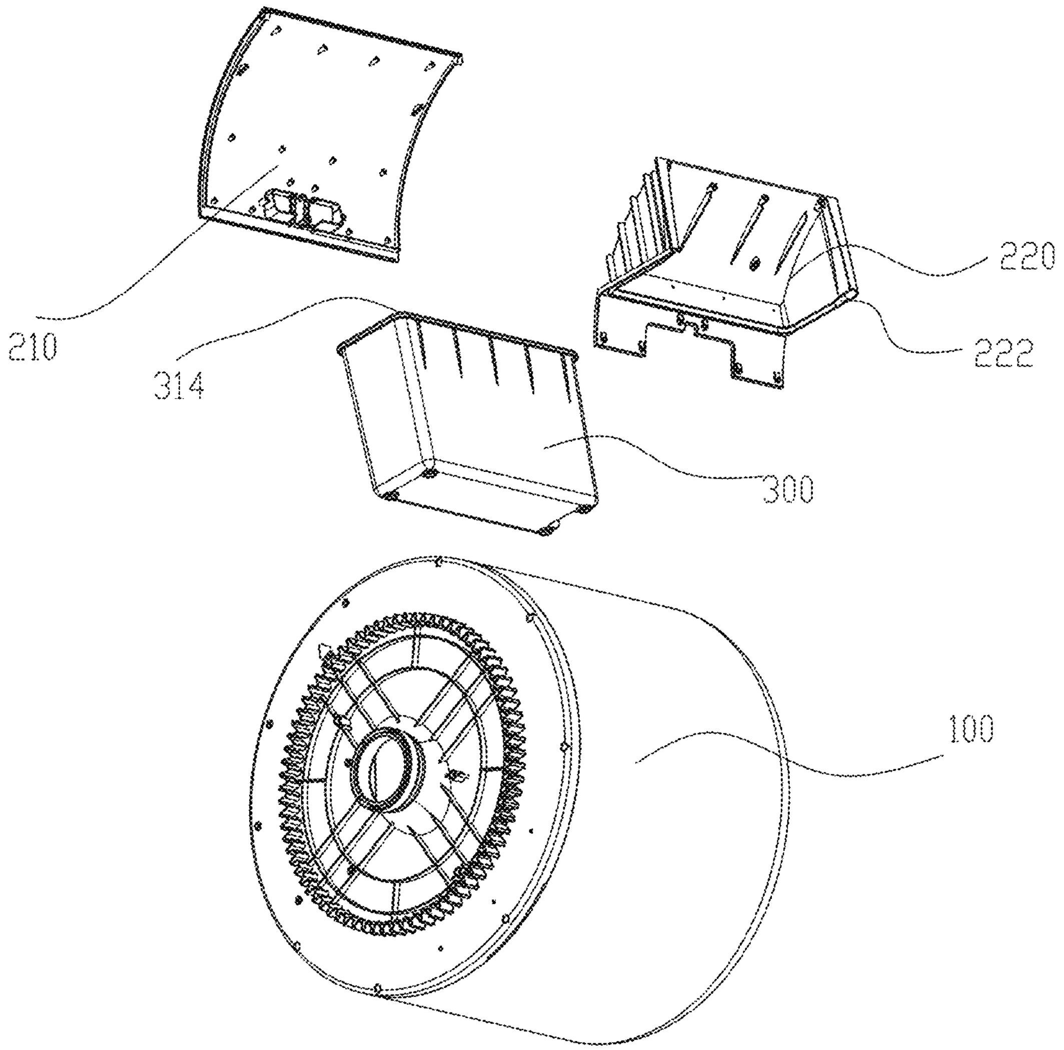
FIG. 4 is an exploded schematic diagram of the rotating drum mechanism according to one embodiment of the present disclosure, where a door assembly is in an open state.

As shown in FIGS. 3-5, a limiting portion 110 is disposed on one end of the rotating drum 100 along the axis. The limiting portion 110 is generally cylindrical, with a neck at one end thereof close to the rotating drum 100. An axis of the limiting portion 110 coincides with the axis of the rotating drum 100.

Correspondingly, a limiting sleeve sleeving the limiting portion 110 is disposed on the base 400. The limiting sleeve is engaged with the limiting portion 110 at the neck of the limiting portion 110. In this way, a horizontal motion of the rotating drum 100 is limited by the limiting portion 110.

Furthermore, a gear ring 120 is disposed on the one end of the rotating drum 100 along the axis. The gear ring 120 is bolted or welded to the rotating drum 100, and an axis of the gear ring 120 also coincides with the axis of the rotating drum 100.

Correspondingly, a gear is sleeved on the output shaft of the drive motor. The gear is keyed to the output shaft of the drive motor and is engaged with the gear ring 120.

When in use, the drive motor directly drives the gear to rotate, and the gear ring 120 rotates to drive the rotating drum 100 to rotate.

Because the gear and gear ring 120 have a large reduction ratio, the drive motor is able to output sufficient torque to drive the rotating drum 100 to rotate. Furthermore, a rotational speed of the rotating drum 100 is less than a rotational speed of the drive motor, makes the rotating drum 100 easy to control.

In the embodiment, the limiting portion 110 and the gear ring 120 are disposed at the same end of the rotating drum 100 and are disposed on a rear side of the rotating drum 100, making a structure of the automatic cat litter box compact and aesthetically pleasing.

When using the automatic cat litter box, the rotating drum mechanism rotates under the drive of the drive motor and other drive structures, causing the cat feces to fall into the waste collection compartment 300. After a certain amount of cat feces has been collected in the waste collection compartment 300, the user may open the door assembly 200, remove the collection chamber 300, and empty the feces.

In all embodiments shown and described herein, any specific value should be interpreted as merely exemplary and not as a limitation. Therefore, other examples of the exemplary embodiments may have different values.

It should be noted that similar reference numerals and letters indicate similar items in the following drawings. Therefore, once an item is defined in one drawing, it does not need to be further defined and explained in the other drawings.

The above-mentioned embodiments only express several embodiments of the present disclosure, and the description thereof is relatively specific and detailed, but should not be construed as a limitation on the scope of the present disclosure. It should be noted that for those of ordinary skill in the art, several modifications and improvements can be made without departing from the concept of the present disclosure, and these modifications and improvements should fall within the protection scope of the present disclosure.

What is claimed is:

1. A automatic cat litter box, comprising:

a rotating drum mechanism;

wherein the rotating drum mechanism comprises a rotating drum, a door assembly movably connected to the rotating drum, and a waste collection compartment;

wherein the waste collection compartment is detachably disposed in the rotating drum mechanism, the door assembly comprises a pressing portion, the waste collection compartment is disposed in the rotating drum, the waste collection compartment comprises an opening portion, and the opening portion is annular;

wherein when the door assembly is closed, the pressing portion is engaged with at least a portion of the opening portion;

wherein the door assembly comprises a door and a door support, the door support is fixedly connected to the door, the door support is disposed on one side of the door facing an interior of the rotating drum, and the pressing portion is disposed on the door support;

wherein first reinforcing ribs are disposed on an inner wall of the door support, the first reinforcing ribs are disposed along a circumferential direction of the rotating drum, and the first reinforcing ribs are arranged along an axis direction of the rotating drum;

wherein second reinforcing ribs are disposed on an outer sidewall of the waste collection compartment, the second reinforcing ribs are disposed along the circumferential direction of the rotating drum, and the second reinforcing ribs are arranged along the axis direction of the rotating drum.

2. The automatic cat litter box according to claim 1, wherein the pressing portion defines a concave surface, the opening portion defines a convex surface, and the concave surface of the pressing portion is tightly attached to the convex surface of the opening portion when the door assembly is closed.

3. The automatic cat litter box according to claim 2, wherein a cross section of the concave surface of the pressing portion and a cross section of the convex surface of the opening portion are arc-shaped.

4. The automatic cat litter box according to claim 2, wherein a cross section of the concave surface of the pressing portion and a cross section of the convex surface of the opening portion are wedge-shaped.

5. The automatic cat litter box according to claim 1, wherein the opening portion comprises a first side edge, a second side edge, and two third side edges;

wherein the first side edge is located on a first side of the opening portion away from the door assembly, the second side edge is located on a second side of the opening portion close to the door assembly, and each of the third side edges is connected to the first side edge and the second side edge;

wherein the pressing portion is engaged with the second side edge of the opening portion when the door assembly is closed.

6. The automatic cat litter box according to claim 5, wherein the pressing portion is further engaged with the two third side edges of the opening portion when the door assembly is closed.

* * * * *